United States Patent
Kheymehdooz (10) Patent No.: US 7,193,804 B1
(45) Date of Patent: Mar. 20, 2007

(54) METHOD AND APPARATUS FOR CONTROLLING HEAD VELOCITY IN A DISK DRIVE DURING RAMP LOAD/UNLOAD

(75) Inventor: Ali Kheymehdooz, San Jose, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 09/910,293

(22) Filed: Jul. 20, 2001

(51) Int. Cl.
*G11B 21/02* (2006.01)
*G11B 5/596* (2006.01)

(52) U.S. Cl. .................. 360/75; 360/78.04; 360/78.12; 318/560; 318/254

(58) Field of Classification Search .................... 360/75
See application file for complete search history.

(56) References Cited

U.S. PATENT DOCUMENTS

| | | | | |
|---|---|---|---|---|
| 5,469,314 A | | 11/1995 | Morehouse et al. | 360/105 |
| 5,566,369 A | * | 10/1996 | Carobolante | 360/75 |
| 5,654,840 A | * | 8/1997 | Patton et al. | 360/75 |
| 5,838,515 A | | 11/1998 | Mortazavi et al. | 360/78.12 |
| 5,963,393 A | * | 10/1999 | Rowan et al. | 360/78.06 |
| 6,016,234 A | | 1/2000 | Blank et al. | 360/75 |
| 6,081,112 A | * | 6/2000 | Carobolante et al. | 324/177 |
| 6,140,784 A | | 10/2000 | Mazda | 318/280 |
| 6,204,629 B1 | * | 3/2001 | Rote et al. | 318/803 |
| 6,396,652 B1 | * | 5/2002 | Kawachi et al. | 360/75 |
| 6,463,211 B1 | * | 10/2002 | Peritore et al. | 318/254 |
| 6,560,057 B1 | * | 5/2003 | Klaassen et al. | 360/75 |
| 6,631,045 B1 | * | 10/2003 | Pedrazzini | 360/75 |
| 6,643,088 B1 | * | 11/2003 | Kawachi | 360/75 |
| 6,867,944 B1 | * | 3/2005 | Ryan | 360/78.04 |
| 2002/0196577 A1 | * | 12/2002 | Harmer | 360/78.06 |

* cited by examiner

*Primary Examiner*—Andrew L. Sniezek
(74) *Attorney, Agent, or Firm*—Tejpal S. Hansra (57) ABSTRACT

A disk drive controls head velocity during ramp load/unload by measuring voltages across a VCM and a sense resistor in series with the VCM, calculating a back EMF voltage using the VCM and sense resistor voltages, and adjusting the head velocity using the back EMF voltage. An embodiment includes amplifying the VCM and sense resistor voltages, multiplexing the amplified voltages, digitizing the multiplexed voltages and calculating the back EMF voltage in discrete-time based on the digitized voltages. Another embodiment includes selecting between PWM and IR cancellation techniques and calculating the back EMF voltage using the selected technique.

70 Claims, 4 Drawing Sheets

METHOD AND APPARATUS FOR CONTROLLING HEAD VELOCITY IN A DISK DRIVE DURING RAMP LOAD/UNLOAD

FIELD OF THE INVENTION

The present invention relates to controlling head velocity in a disk drive during ramp load or unload.

BACKGROUND OF THE INVENTION

Disk drives include one or more disks on which digital information is stored as magnetic charges. The disk (or disks) is mounted on a spindle rotated by a spindle motor. An actuator assembly includes an actuator arm and a voice coil motor (VCM). The actuator arm extends from the VCM and supports a slider that includes a read/write head. The head reads from and writes to the disk as the slider flies over the disk on an air cushion. The VCM positions the head at desired locations relative to the disk.

Disk drives have been designed with a landing zone at the inner diameter of the disk to park the head. The landing zone is a takeoff or landing spot for the head as the disk starts or stops spinning, respectively. As the disk starts spinning, the head is dragged on the disk until the disk reaches a speed that creates sufficient air pressure for the head to separate from and fly over the disk.

The disk can have a rough texture to minimize friction between the head and the disk in the landing zone. However, as disk drive storage capacity increases, the flying height of the head decreases, and the disk is given a smooth texture to avoid damaging the head. The smooth texture dramatically increases the contact friction between the head and the disk in the landing zone. As a result, increased spindle motor current may be required to break the head loose from the disk to allow the disk to rotate, or spin up.

Disk drives have increasingly smaller form factors, or disk sizes (2.5", 1.8" and 1"). Small form factors are useful in battery-operated devices where increased spindle motor current to spin up the disk is undesirable. Small form factors reduce the disk surface area, which is reduced further by a landing zone. Small form factors are also more susceptible to operational and non-operational shock if the head and the disk are in contact. Thus, small form factors are penalized by a landing zone.

Disk drives have been designed with a ramp to avoid a landing zone. The head is lifted off the disk and unloaded on the ramp while the disk is spinning, and then the disk decelerates and stops spinning. When power is reapplied to the spindle motor, the disk spins up, and once the disk has sufficient speed for the head to fly, the head is loaded from the ramp and positioned over the disk.

During ramp load/unload, the head velocity is accurately controlled to avoid damaging the head or the disk at a contact point. As the VCM moves through its magnetic poles, it generates a back electromotive field (EMF) voltage which is proportional to its speed. The back EMF voltage also indicates the head velocity. The back EMF voltage (Vbemf) can be calculated based on the total voltage across the VCM (Vvcm) and the IR drop across the VCM (Ivcm×Rvcm) as follows:

$$\text{Vbemf} = \text{Vvcm} - (\text{Ivcm} \times \text{Rvcm}) \tag{1}$$

Thus, the back EMF voltage is measured by removing the VCM IR drop from the VCM voltage.

The back EMF voltage can be measured by a pulse width modulation (PWM) technique or an IR cancellation technique. In the PWM technique, the VCM is turned off periodically, forcing the VCM current to zero. Since the IR drop across the VCM is zero, the back EMF voltage is readily measured. In the IR cancellation technique, the back EMF voltage is determined by measuring the gain of a servo loop. Since the VCM current is not periodically turned off, calibrations cancel the IR drop from the VCM voltage. The calibrations may need to be repeated because temperature and voltage deviations cause the gain of the servo loop to change frequently over time.

The PWM technique requires less hardware and fewer calibrations than the IR cancellation technique. However, the PWM technique may generate audible noise during ramp load/unload. The IR cancellation technique, however, requires robust calibration with more hardware. Further, increased voltage resolution may require a hardware change to increase the number of bits of the analog-to-digital converter.

Disk drives have been designed for either the PWM or IR cancellation techniques. If both techniques were needed, two distinct sets of hardware had to be implemented, thereby increasing cost. Further, the technique needed to be selected before any voltage measurements, thereby greatly reducing flexibility.

There is, therefore, a need for a disk drive with accurate control of the head during ramp load/unload. There is also a need for a disk drive that measures the back EMF voltage with either the PWM technique or the IR cancellation technique without hardwiring a specific measurement technique or making multiple calibrations prior to operation of the disk drive.

SUMMARY OF THE INVENTION

To achieve these and other advantages and in accordance with the present invention, as embodied and broadly described, a method and apparatus for controlling the velocity of a head during a ramp load/unload are disclosed.

A disk drive controls head velocity during ramp load/unload by measuring voltages across a VCM and a sense resistor in series with the VCM, calculating a back EMF voltage using the VCM and sense resistor voltages, and adjusting the head velocity using the back EMF voltage.

An embodiment includes amplifying the VCM and sense resistor voltages, multiplexing the amplified voltages, digitizing the multiplexed voltages and calculating the back EMF voltage in discrete-time based on the digitized voltages.

Another embodiment includes selecting between the PWM and IR cancellation techniques and calculating the back EMF voltage using the selected technique without two distinct sets of hardware.

Another embodiment includes calculating a calibration constant by comparing reference voltages across the VCM and the sense resistor while no current is applied to the VCM with voltages across the VCM and the sense resistor while current is applied to the VCM.

Another embodiment includes calculating a control variable in the discrete time domain using a proportional-integral control technique that compares a target head velocity to an actual head velocity and adjusting the head velocity based on the control variable.

BRIEF DESCRIPTION OF THE DRAWINGS

These and other features and advantages of the present invention are more fully described in the following drawings and accompanying text in which like reference numbers represent corresponding elements throughout.

DETAILED DESCRIPTION

Figure 1:
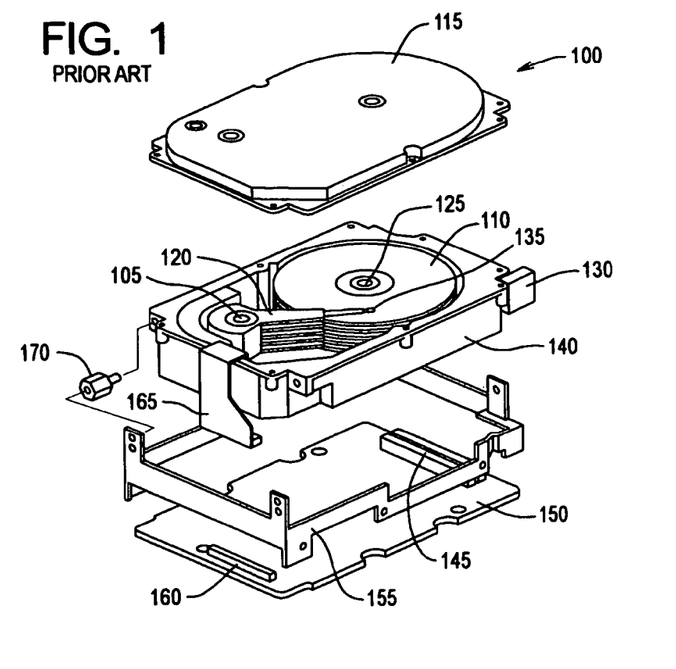
FIG. 1 illustrates a disk drive.

FIG. 1 illustrates a conventional disk drive 100 that includes a voice coil motor (VCM) 105, a disk 110, a cover 115, an actuator arm 120, a spindle 125, a DC power input 130, a read/write head 135, a base casting 140, an I/O connector 145, a printed circuit board 150, a frame/bracket 155, a connector 160, a printed circuit cable 165 and a shock mount 170.

The disk 110 is coated on both sides with media that stores information. The disk 110 is mounted on the cylindrical spindle 125 that, during operation, rotates the disk 110 at high speed. The head 135 is positioned over and reads from and writes to the disk 110. The head 135 is embedded in a slider mounted on the actuator arm 120. The VCM 105 and the actuator arm 120 form an actuator assembly that moves the head 135 relative to the disk 110 as needed for read/write operations. The disk drive 100 is enclosed by the cover 115 and the base casting 140.

Figure 2:
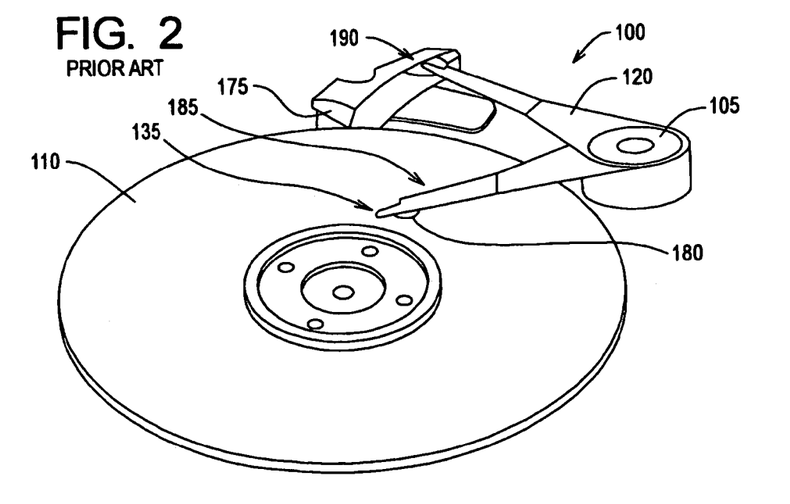
FIG. 2 illustrates ramp load/unload.

FIG. 2 illustrates ramp load/unload in the disk drive 100. The disk drive 100 includes a ramp 175, and the actuator arm 120 includes a lift tab 180. During read/write operations, the head 135 flies over the disk 110 at a read/write position 185 on an air cushion caused by the rotation of the disk 110. During ramp unload, the VCM 105 moves the head 135 from the disk 110 onto the ramp 175 while the disk 110 is still spinning. After the head 135 comes to rest at a park position 190, the disk drive 100 stops the rotation of the disk 110. Similarly, during ramp load, the disk drive 100 spins up the disk 110, and when the disk 110 spins at sufficient velocity for the head 135 to fly above the disk 110, the VCM 105 moves the head 135 from the ramp 175 to the disk 110.

Figure 3:
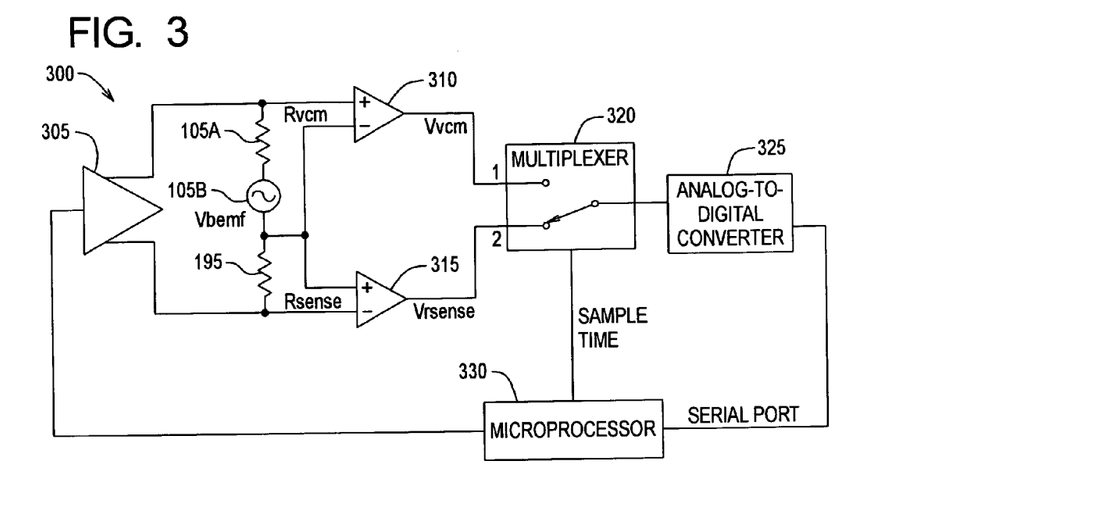
FIG. 3 illustrates a ramp load/unload control circuit.

FIG. 3 illustrates a ramp load/unload control circuit 300. The control circuit 300 includes a driver 305, a first operational amplifier 310, a second operational amplifier 315, a multiplexer 320, an analog-to-digital converter (ADC) 325 and a microprocessor 330.

The VCM 105 has an internal resistance (Rvcm) 105A, a back EMF voltage (Vbemf) 105B and a total voltage (Vvcm). The VCM 105 is connected in series with a sense resistor 195 with a sense resistance (Rsense).

The driver 305 has a first output that is connected to the VCM 105 and a positive input of the first operational amplifier 310, and a second output that is connected to the sense resistor 195 and a negative input of the second operational amplifier 315. The VCM 105 is connected to the sense resistor 195, a negative input of the first operational amplifier 310 and a positive input of the second operational amplifier 315 at a node.

The driver 305 powers the VCM 105 by sending a current through the VCM 105 and the sense resistor 195. The first operational amplifier 310 receives and amplifies the total voltage across the VCM 105 (Vvcm). The second operational amplifier 315 receives and amplifies the voltage across the sense resistor 195 (Vrsense). The multiplexer 320 selects between the amplified VCM voltage from the first operational amplifier 310 at a first voltage path and the amplified sense resistor voltage from the second operational amplifier 315 at a second voltage path in response to a sample signal from the microprocessor 330. The ADC 325 coverts the multiplexed voltage selected by the multiplexer 320 from analog to digital format, and sends the digital signal along a serial port to the microprocessor 330.

The microprocessor 330 calculates the back EMF voltage based on the VCM voltage and the sense resistor voltage, as amplified by the operational amplifiers 310 and 315, multiplexed by the multiplexer 320 and digitized by the ADC 325. The microprocessor 330 also calculates the VCM velocity based on the back EMF voltage, and sends a control signal to the driver 105 in a feedback loop to accurately control the head velocity.

The microprocessor 330 calculates the back EMF voltage by selecting between the PWM technique and the IR cancellation technique. As a result, the disk drive 100 calculates the back EMF voltage using a selected one of the PWM technique and the IR cancellation technique without implementing two distinct sets of hardware.

Figure 4:
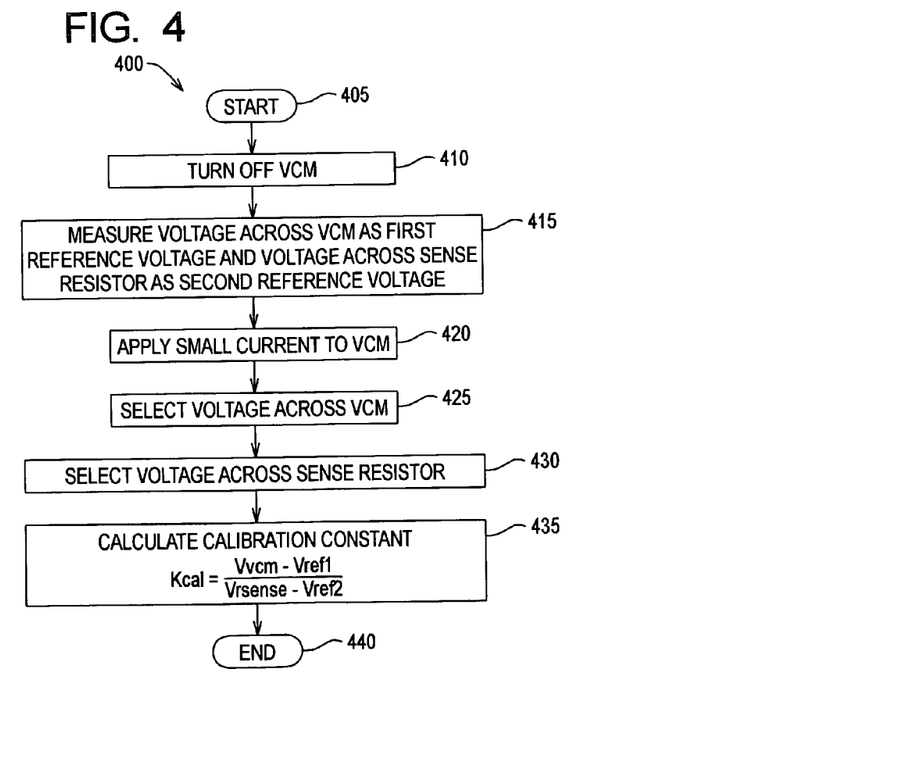
FIG. 4 is a flowchart of a calibration algorithm.

The microprocessor 330 calibrates the control circuit 300 using the calibration algorithm 400 described below. The calibration algorithm 400 calculates a gain calibration constant (Kcal) using the following IR cancellation technique:

$$Kcal = \frac{i \times Rvcm \times Kvcm}{i \times Rsense \times Ksense} \tag{2}$$

if Kvcm=1 and Ksense=1 then $$Kcal = \frac{i \times Rvcm}{i \times Rsense} \tag{3}$$

At start-up, a small VCM current is applied towards the outer crash stop making the back EMF voltage zero:

$$i \times Rvcm = Vvcm - Vref1 \tag{4}$$

$$i \times Rsense = Vrsense - Vref2 \tag{5}$$

Therefore, the following relationship is established:

$$i \times Rvcm = Kcal \times (i \times Rsense) \tag{6}$$

Substitution yields the following equality:

$$(Vvcm - Vref1) = Kcal \times (Vrsense - Vref2) \tag{7}$$

The microprocessor 330 calibrates the control circuit 300 by determining the calibration constant (Kcal) as follows:

$$Kcal = \frac{Vvcm - Vref1}{Vrsense - Vref2} \tag{8}$$

After calibrating the control circuit 300, the microprocessor 330 monitors the back EMF voltage at sample times to determine whether to increase or decrease the current controlling the head velocity.

FIG. 4 is a flow chart of a calibration algorithm 400 that the control circuit 300 implements to determine a gain calibration constant (Kcal) at power-up of the disk drive 100. At step 405, the calibration algorithm 400 starts. At step 410, the driver 305 turns off the current to the VCM 105. At step 415, the microprocessor 330 measures the VCM voltage (Vvcm) and the sense resistor voltage (Vrsense) to provide a first reference voltage (Vref1) and a second reference voltage (Vref2) respectively. At step 420, the driver 305 applies a small current to the VCM 105 to urge the head 135 in the unload direction (towards a crash stop, away from the disk 110). At step 425, the multiplexer 320 selects the VCM voltage (Vvcm), and at step 430, the multiplexer 320 selects the sense resistor voltage (Vrsense). At step 435, the microprocessor 330 calculates the calibration constant (Kcal) according to equation (8). At step 440, the calibration algorithm 400 ends.

Figure 5:
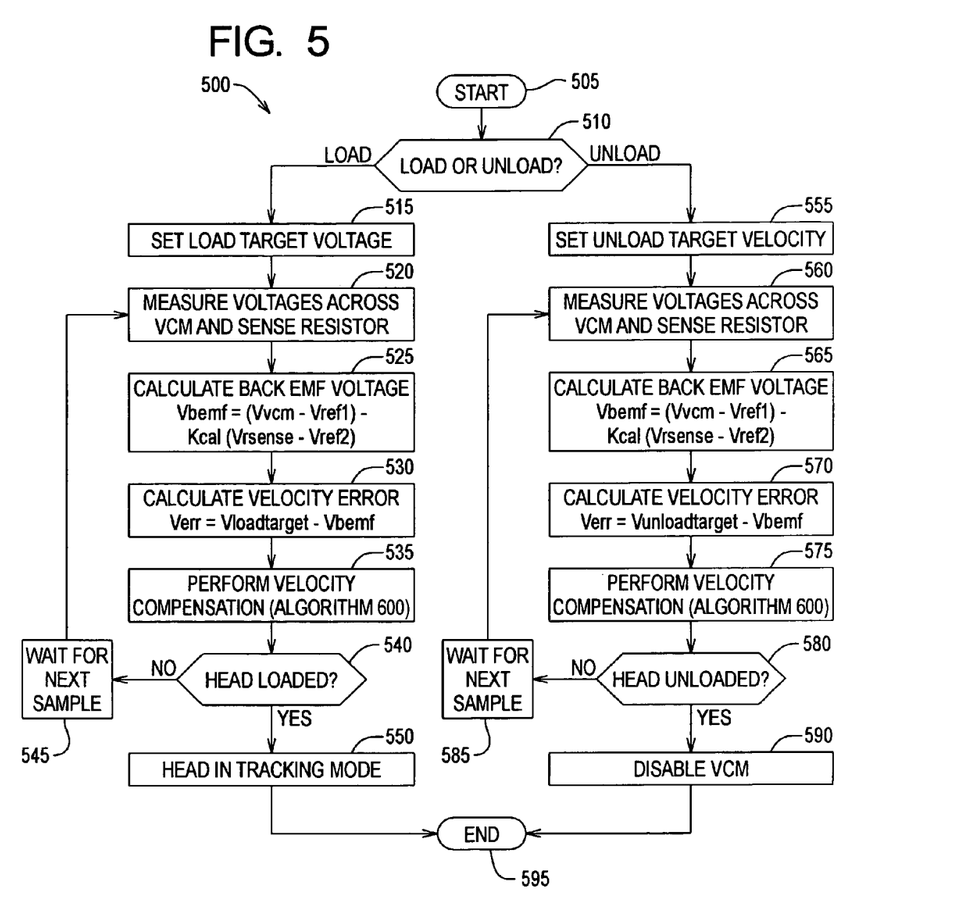
FIG. 5 is a flowchart of a load/unload algorithm.

FIG. 5 is a flow chart of a load/unload algorithm 500 that the control circuit 300 implements to control the velocity of the head 135 during ramp load/unload. At step 505, the load/unload algorithm starts. At step 510, the microprocessor 330 determines whether the head 135 is being loaded from or unloaded onto the ramp 175. If the head 135 is being loaded from the ramp 175, then at step 515 the microprocessor 330 sets the voltage corresponding to the target velocity of the head 135 (Vloadtarget). At step 520, the microprocessor 330 measures the VCM voltage (Vvcm) and the sense resistor voltage (Vrsense). At step 525, the microprocessor 330 calculates the back EMF voltage (Vbemf) as follows:

$$Vbemf = (Vvcm - Vref1) - Kcal \times (Vrsense - Vref2) \quad (9)$$

At step 530, the microprocessor 330 calculates a velocity error (Verr) as follows:

$$Verr = Vloadtarget - Vbemf \quad (10)$$

Figure 6:
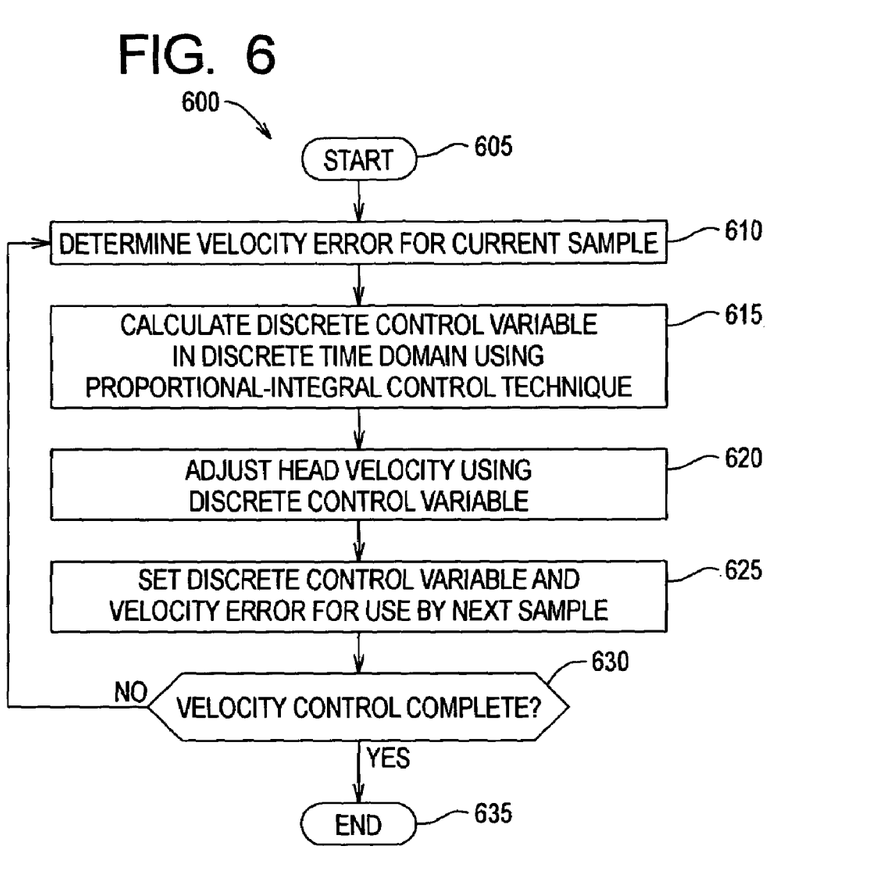
FIG. 6 is a flowchart of a velocity compensation algorithm.

At step 535, the microprocessor 330 performs the velocity compensation algorithm 600 described below to adjust the velocity of the head 135. At step 540, the microprocessor 330 determines whether the head 135 is loaded on the disk 110. If the loading procedure is not complete, then at step 545 the microprocessor 330 waits for the next sampling period and then the process returns to step 520 to measure the next VCM voltage (Vvcm) and sense resistor voltage (Vrsense). If the loading procedure is complete, then at step 550 the head 135 is locked into tracking mode and at step 595 the load/unload algorithm 500 ends.

Returning to step 510, if the microprocessor 330 determines that the head 135 is being unloaded onto the ramp 175, then at step 555 the microprocessor 330 sets the voltage corresponding to the target velocity of the head 135 (Vunloadtarget). At step 560, the microprocessor 330 measures the VCM voltage (Vvcm) and the sense resistor voltage (Vrsense). At step 565, the microprocessor 330 calculates the back EMF voltage (Vbemf) according to equation (9). At step 570 the microprocessor 330 calculates the velocity error (Verr) as follows:

$$Verr = Vunloadtarget - Vbemf \quad (11)$$

At step 575, the microprocessor 330 performs the velocity compensation algorithm 600 described below to adjust the velocity of the head 135. At step 580, the microprocessor 330 determines whether the head is unloaded from the disk 110. If the unloading procedure is not complete, then at step 585 the microprocessor 330 waits for the next sampling period and then the process returns to step 560 to measure the next VCM voltage (Vvcm) and sense resistor voltage (Vrsense). If the unloading procedure is complete, then at step 590 the VCM 105 is disabled and at step 595 the load/unload algorithm 500 ends.

FIG. 6 is a flow chart of a velocity compensation algorithm 600 that the microprocessor 330 initiates to correct the velocity of the head 135. At step 605, the velocity compensation algorithm 600 begins. At step 610, the microprocessor 330 determines the velocity error (Verr(n)) for the current sample as previously described in steps 530 or 570 of the load/unload algorithm 500. At step 615, the microprocessor 330 determines a discrete control variable (control(n)) that will be used by the driver 305 to adjust the head velocity. Although several methods of velocity compensation are well known in the art and may be employed in the present invention, the preferred embodiment employs a proportional-integral control technique, where Kp is a proportional constant and Ki an integral constant. Both Kp and Ki are selected according to the desired frequency and transient responses for the velocity control loop. The proportional-integral control technique calculates the discrete control variable in the continuous time domain as follows:

$$\text{Output\_command} = \left(Kp + \frac{Ki}{S}\right) \times Verr \quad (12)$$

The microprocessor 330 calculates the discrete control variable (control(n)) in the discrete time domain using the proportional-integral control technique as follows:

$$\text{Control}(n) = \text{Control}(n-1) + Ki \times (T-Kp) \times Verr(n-1) + Kp \times (Verr(n)) \quad (13)$$

where (n) denotes the current sample and (n−1) denotes the previous sample. The discrete control variable corrects the head velocity by comparing the voltage corresponding to the target velocity with the voltage corresponding to the actual velocity of the head 135 as determined by the back EMF voltage. At step 620, the microprocessor 330 sends the discrete control variable to the driver 305, and the driver 305 adjusts the head velocity based on the discrete control variable. At step 625, the microprocessor 330 sets the discrete control variable and the velocity error of the current sample (control(n) and Verr(n)) to the previous sample (control(n−1) and Verr(n−1)) for use by the next sample. At step 630, the microprocessor 330 determines whether the velocity compensation algorithm 600 continues. If so, then the process returns to step 610 for the next sample, otherwise at step 635 the velocity compensation algorithm 600 ends.

EXAMPLE

The present invention is illustrated by the following example. The VCM resistance and the sense resistor are as follows:

Rvcm 320=17.1Ω

Rsense 330=1Ω

The gains of the first operational amplifier 310 (Kvcm) and the second operational amplifier 315 (Krsense) are as follows:

Kvcm=5

Krsense=4

The ADC 325 uses 12-bits with a full-scale voltage of 5 volts and has the following resolution:

$$\text{ADC\_resolution} = \frac{\text{ADC\_FS\_voltage}}{2^{\text{ADC\_bits}} - 1} = \frac{5}{2^{12} - 1} = 1.221 \cdot 10^{-3} \text{ V/count}$$

The driver 305 provides a reference voltage of 2.5 volts to the sense resistor 195 and the second operational amplifier 315 when the back EMF voltage is zero. The first and second reference voltages (Vref1 and Vref2) are as follows:

Vref1=2.520 volts

Vref2=2.510 volts

The ADC counts corresponding to the first and second reference voltages at the first and second voltage paths are as follows:

$$\text{ADC\_Vref1\_count} = \frac{Vref1 \cdot 2^{\text{ADC\_bits}}}{\text{ADC\_FS\_voltage}} = 2064$$

$$\text{ADC\_Vref2\_count} = \frac{Vref2 \cdot 2^{\text{ADC\_bits}}}{\text{ADC\_FS\_voltage}} = 2056$$

The VCM voltage (Vvcm) when the VCM current (Ivcm) is 10 mA is as follows:

$$Vvcm = Vref1 + Ivcm \times Rvcm \times Kvcm$$
$$= 2.52 \text{ v} + 10 \text{ mA} \times 17.1 \,\Omega \times 5$$
$$= 3.375 \text{ volts}$$

The ADC count corresponding to Vvcm is as follows:

$$\text{ADC\_Vvcm\_count} = \text{Interger}\left(\frac{Vvcm \cdot 2^{\text{ADC\_bits}}}{\text{ADC\_FS\_voltage}} - \text{ADC\_Vref1\_count}\right)$$
$$= (3.375 \text{ v} \times 4096)/5 \text{ v} - 2064$$
$$= 701$$

The Vrsense is as follows:

$$Vrsense = Vref2 + Ivcm \times Rsense \times Ksense$$
$$= 2.51 \times 10 \text{ mA} \times 1\,\Omega \times 4$$
$$= 2.55 \text{ volts}$$

The ADC count corresponding to Vrsense is as follows:

$$\text{ADC\_Vrsense\_count} = \text{Integer}\left(\frac{Vvcm \cdot 2^{\text{ADC\_bits}}}{\text{ADC\_FS\_voltage}} - \text{ADC\_Vref2\_count}\right)$$
$$= (2.55 \text{ v} \times 4096)/5 \text{ v} - 2056$$
$$= 33$$

Finally, the calibration constant (Kcal) is as follows:

$$Kcal = \frac{\text{ADC\_Vvcm\_count}}{\text{ADC\_Vrsense\_count}}$$
$$= 700/33$$
$$= 21.21$$

The number of bits in the ADC 325 may be increased if greater accuracy or resolution is desired, or reduced to decrease computational burden.

It will be apparent to those skilled in the art that various modifications and variations can be made to the embodiments described above without departing from the spirit or the scope of the invention. Thus, it is intended that the present invention cover modifications and variations that come within the claims and their equivalents.

What is claimed is:

1. A method of controlling a head velocity during a ramp load/unload comprising:

measuring voltages across a voice coil motor (VCM) and a sense resistor in series with the VCM, wherein the VCM and sense resistor voltage measurements are calibrated at power-up;

providing multiplexed voltages using the VCM and sense resistor voltages;

calculating a back EMF voltage using the multiplexed voltages; and adjusting the head velocity using the back EMF voltage.

2. The method of claim 1 wherein the back EMF voltage is calculated using a PWM technique.

3. The method of claim 1 wherein the back EMF voltage is calculated using an IR cancellation technique.

4. The method of claim 1 wherein a microprocessor calculates the back EMF voltage.

5. The method of claim 4 wherein the microprocessor calculates the back EMF voltage using a PWM technique.

6. The method of claim 4 wherein the microprocessor calculates the back EMF voltage using an IR cancellation technique.

7. The method of claim 6 wherein the microprocessor calculates the back EMF voltage by selecting between a PWM technique and an IR cancellation technique and using the selected technique.

8. The method of claim 4 wherein the microprocessor calculates the back EMF voltage using a calibration constant which is calculated using the VCM and sense resistor voltages while current is applied to the VCM and using the VCM and sense resistor voltages while no current is applied to the VCM.

9. The method of claim 4 wherein the microprocessor adjusts the head velocity in real-time.

10. A method of controlling a head velocity during a ramp load/unload comprising:

setting a target velocity;

measuring voltages across a voice coil motor (VCM) and a sense resistor in series with the VCM through separate voltage paths;

calculating a back EMF voltage using the voltages across the VCM and the sense resistor;

calculating a velocity error using the target velocity and the back EMF voltage;

calculating a control variable using the velocity error;

sending the control variable to a driver that controls the head velocity; and adjusting the head velocity using the control variable.

11. The method of claim 10 further comprising calculating the control variable using a proportional-integral control technique.

12. The method of claim 10 wherein the control variable is calculated in discrete-time.

13. The method of claim 12 further comprising using a velocity error for a previous sampling period to calculate the velocity error for a current sampling period.

14. The method of claim 13 further comprising using a control variable for the previous sampling period to calculate the control variable for the current sampling period.

15. The method of claim 10 further comprising disabling the VCM at completion of the ramp load/unload.

16. The method of claim 15 further comprising stopping the control of the head velocity at completion of the ramp load/unload.

17. A method of measuring a head velocity during a ramp load/unload comprising:
measuring voltages across a voice coil motor (VCM) and a sense resistor in series with the VCM, wherein the VCM and sense resistor voltage measurements are calibrated at power-up;
providing multiplexed voltages using the VCM and sense resistor voltages;
calculating a back EMF voltage using the multiplexed voltages; and
calculating the head velocity using the back EMF voltage.

18. The method of claim 17 further comprising using a head velocity for a previous sampling period to calculate the head velocity for a current sampling period.

19. A disk drive comprising:
a disk;
a head that reads from and writes to the disk;
an actuator assembly that positions the head relative to the disk, wherein the actuator assembly includes an actuator arm and a voice coil motor (VCM), and the actuator arm is located between the head and the VCM;
a driver for driving the VCM;
a sense resistor in series with the VCM;
a first operational amplifier for amplifying a voltage across the VCM;
a second operational amplifier for amplifying a voltage across the sense resistor;
a multiplexer for multiplexing the amplified voltages; and
a microprocessor for calculating a back EMF voltage based on the multiplexed voltages.

20. The disk drive of claim 19 wherein the microprocessor sends a control signal based on the back EMF voltage to the driver.

21. The disk drive of claim 19 wherein the microprocessor calculates a velocity of the VCM based on the back EMF voltage and sends a control signal based on the velocity to the driver.

22. The disk drive of claim 19 further comprising an analog-to-digital converter for converting the multiplexed voltages to a digital signal for the microprocessor.

23. The disk drive of claim 22 further comprising a serial port between the analog-to-digital converter and the microprocessor.

24. The disk drive of claim 22 further comprising a node connected to the VCM, the sense resistor, a negative input of the first operational amplifier and a positive input of the second operational amplifier.

25. The disk drive of claim 22 wherein the microprocessor calculates the back EMF voltage by selecting between a PWM technique and an IR cancellation technique and using the selected technique.

26. A method of controlling a head velocity during a ramp load/unload comprising:
measuring voltages across a voice coil motor (VCM) and a sense resistor in series with the VCM;
calculating a back EMF voltage using the VCM and sense resistor voltages, wherein the back EMF voltage is calculated using either a PWM technique or an IR cancellation technique, and both techniques are available for calculating the back EMF voltage without two distinct sets of hardware; and
adjusting the head velocity using the back EMF voltage.

27. A method of controlling a head velocity during a ramp load/unload comprising:
measuring voltages across a voice coil motor (VCM) and a sense resistor in series with the VCM through separate voltage paths;
calculating a calibration constant by comparing the VCM voltage with a first reference voltage and comparing the sense resistor voltage with a second reference voltage;
calculating a back EMF voltage using the VCM and sense resistor voltages; and
adjusting the head velocity using the back EMF voltage.

28. The method of claim 27 further comprising calculating the back EMF voltage using the calibration constant.

29. A method of measuring a head velocity during a ramp load/unload comprising:
measuring voltages across a voice coil motor (VCM) and a sense resistor in series with the VCM through separate voltage paths;
calculating a calibration constant by comparing the VCM voltage with a first reference voltage and comparing the sense resistor voltage with a second reference voltage;
calculating a back EMF voltage using the voltages across the VCM and the sense resistor; and
calculating the head velocity using the back EMF voltage.

30. The method of claim 29 further comprising calculating the back EMF voltage using the calibration constant.

31. In a disk drive that includes a disk, a head that reads from and writes to the disk, a voice coil motor (VCM) that positions the head relative to the disk, a sense resistor in series with the VCM, and a ramp where the head is parked when the disk is not spinning, a method of operating the disk drive comprising:
measuring a voltage across the VCM;
measuring a voltage across the sense resistor;
generating a first voltage based on the VCM voltage;
generating a second voltage based on the sense resistor voltage;
multiplexing the first and second voltages to provide multiplexed voltages that alternate between the first and second voltages; and
calculating a back EMF voltage of the VCM based on the multiplexed voltages.

32. The method of claim 31 further comprising generating the first voltage by amplifying the VCM voltage and generating the second voltage by amplifying the sense resistor voltage.

33. The method of claim 31 further comprising converting the multiplexed voltages from an analog signal to a digital signal and calculating the back EMF voltage based on the digital signal.

34. The method of claim 31 further comprising calculating the back EMF voltage in discreet-time.

35. The method of claim 31 further comprising calculating the back EMF voltage by selecting between a PWM technique and an IR cancellation technique and using the selected technique, wherein both techniques are available for calculating the back EMF voltage without two distinct sets of hardware.

36. The method of claim 31 further comprising generating the VCM and sense resistor voltages using a driver, generating the first voltage using a first operational amplifier, generating the second voltage using a second operational amplifier, multiplexing the first and second voltages using a multiplexer, digitizing the multiplexed voltages using an analog-to-digital converter and calculating the back EMF voltage using a microprocessor.

37. The method of claim 36 wherein the driver has a first output connected to the VCM and a positive input of the first operational amplifier, the driver has a second output connected to the sense resistor and a negative input of the second operational amplifier, a node is connected to the VCM, the sense resistor, a negative input of the first operational amplifier and a positive input of the second operational amplifier, the node is connected to the first output of the driver by the VCM and the second output of the driver by the sense resistor, the multiplexer has a first input connected to an output of the first operational amplifier and a second input connected to an output of the second operational amplifier, the analog-to digital converter has an input connected to an output of the multiplexer and an output connected to the microprocessor, and the microprocessor controls the driver and the multiplexer.

38. The method of claim 31 further comprising adjusting a velocity of the head based on the back EMF voltage.

39. The method of claim 38 further comprising performing the method during a ramp load in which the head is moved off the ramp and towards the disk.

40. The method of claim 38 further comprising performing the method during a ramp unload in which the head is moved away from the disk and on the ramp.

41. The method of claim 31 further comprising calculating a calibration constant and calculating the back EMF voltage based on the calibration constant.

42. The method of claim 41 wherein calculating the calibration constant includes:
measuring a reference voltage (Vref1) across the VCM while no current is applied to the VCM;
measuring a reference voltage (Vref2) across the sense resistor while no current is applied to the sense resistor;
measuring another voltage (Vvcm) across the VCM while a current is applied to the VCM;
measuring another voltage (Vrsense) across the sense resistor while a current is applied to the sense resistor; and
calculating the calibration constant (Kcal) according to the equation $$Kcal = \frac{Vvcm - Vref1}{Vrsense - Vref2}.$$

43. The method of claim 42 further comprising calculating the calibration constant while the head is parked on the ramp.

44. The method of claim 42 further comprising calculating the calibration constant during power-up of the disk drive.

45. The method of claim 42 further comprising calculating the calibration constant only while the head is parked on the ramp during power-up of the disk drive.

46. The method of claim 31 further comprising calculating a control variable based on the back EMF voltage and a target velocity voltage and adjusting a velocity of the head based on the control variable.

47. The method of claim 46 wherein calculating the control variable includes calculating a velocity error as a difference between the back EMF voltage and the target velocity voltage.

48. The method of claim 46 wherein calculating the control variable includes using a proportional-integral control technique.

49. The method of claim 46 wherein calculating the control variable includes measuring the VCM and sense resistor voltages during a current sampling period and using a previous control variable from a previous sampling period.

50. The method of claim 46 wherein calculating the control variable includes using a proportional-integral control technique that measures the VCM and sense resistor voltages during a current sampling period and uses a previous control variable from a previous sampling period.

51. In a disk drive that includes a disk, a head that reads from and writes to the disk, a voice coil motor (VCM) that positions the head relative to the disk, a sense resistor in series with the VCM, a ramp where the head is parked when the disk is not spinning, a driver that drives the VCM, a first operational amplifier, a second operational amplifier, a multiplexer, a digital-to-analog converter and a microprocessor, a method of controlling a velocity of the head comprising:
applying a current across the VCM and the sense resistor to generate voltages across the VCM and the sense resistor using the driver;
generating a first voltage based on the VCM voltage using the first operational amplifier;
generating a second voltage based on the sense resistor voltage using the second operational amplifier;
multiplexing the first and second voltages to provide multiplexed voltages that alternate between the first and second voltages using the multiplexer;
digitizing the multiplexed voltages using the analog-to-digital converter;
calculating a back EMF voltage of the VCM based on the digitized multiplexed voltages using the microprocessor; and
adjusting the head velocity based on the back EMF voltage using the driver.

52. The method of claim 51 further comprising calculating the back EMF voltage by the microprocessor selecting between a PWM technique and an IR cancellation technique and using the selected technique, wherein both techniques are available for calculating the back EMF voltage without two distinct sets of hardware.

53. The method of claim 51 wherein the driver has a first output connected to the VCM and a positive input of the first operational amplifier, the driver has a second output connected to the sense resistor and a negative input of the second operational amplifier, a node is connected to the VCM, the sense resistor, a negative input of the first operational amplifier and a positive input of the second operational amplifier, the node is connected to the first output of the driver by the VCM and the second output of the driver by the sense resistor, the multiplexer has a first input connected to an output of the first operational amplifier and a second input connected to an output of the second operational amplifier, the analog-to digital converter has an input connected to an output of the multiplexer and an output connected to the microprocessor, and the microprocessor controls the driver and the multiplexer.

54. The method of claim 51 further comprising performing the method during a ramp load in which the head is moved off the ramp and towards the disk.

55. The method of claim 51 further comprising performing the method during a ramp unload in which the head is moved away from the disk and on the ramp.

56. The method of claim 51 further comprising calculating a calibration constant and calculating the back EMF voltage using the calibration constant, wherein calculating the calibration constant includes:
measuring a reference voltage (Vref1) across the VCM while no current is applied to the VCM;
measuring a reference voltage (Vref2) across the sense resistor while no current is applied to the sense resistor;
measuring another voltage (Vvcm) across the VCM while a current is applied to the VCM;
measuring another voltage (Vrsense) across the sense resistor while a current is applied to the sense resistor; and
calculating the calibration constant (Kcal) according to the equation $$Kcal = \frac{Vvcm - Vref1}{Vrsense - Vref2}.$$

57. The method of claim 56 further comprising calculating the calibration constant only while the head is parked on the ramp during power-up of the disk drive.

58. The method of claim 51 further comprising calculating a control variable using the back EMF voltage and a target velocity voltage and adjusting the head velocity based on the control variable.

59. The method of claim 58 wherein calculating the control variable includes calculating a velocity error as a difference between the back EMF voltage and the target velocity voltage.

60. The method of claim 58 wherein calculating the control variable includes using a proportional-integral control technique that measures the VCM and sense resistor voltages during a current sampling period and uses a previous control variable from a previous sampling period.

61. In a disk drive that includes a disk, a head that reads from and writes to the disk as the head flies above the disk on an air cushion and the disk is spinning, a voice coil motor (VCM) that positions the head relative to the disk, a sense resistor in series with the VCM, a ramp where the head is parked when the disk is not spinning, a driver that drives the VCM, a first operational amplifier, a second operational amplifier, a multiplexer, a digital-to-analog converter and a microprocessor, a method of controlling a velocity of the head during at least one of (1) a ramp load in which the head is moved off the ramp and towards the disk and (2) a ramp unload in which the head is moved away from the disk and on the ramp, the method comprising:
applying a current across the VCM and the sense resistor to generate voltages across the VCM and the sense resistor using the driver;
generating a first voltage based on the VCM voltage using the first operational amplifier;
generating a second voltage based on the sense resistor voltage using the second operational amplifier;
multiplexing the first and second voltages to provide multiplexed voltages that alternate between the first and second voltages using the multiplexer;
digitizing the multiplexed voltages using the analog-to-digital converter;
calculating a back EMF voltage of the VCM based on the digitized multiplexed voltages using the microprocessor; and
adjusting the head velocity based on the back EMF voltage using the driver.

62. The method of claim 61 further comprising calculating the back EMF voltage by the microprocessor selecting between a PWM technique and an IR cancellation technique and using the selected technique, wherein both techniques are available for calculating the back EMF voltage without two distinct sets of hardware.

63. The method of claim 61 wherein the driver has a first output connected to the VCM and a positive input of the first operational amplifier, the driver has a second output connected to the sense resistor and a negative input of the second operational amplifier, a node is connected to the VCM, the sense resistor, a negative input of the first operational amplifier and a positive input of the second operational amplifier, the node is connected to the first output of the driver by the VCM and the second output of the driver by the sense resistor, the multiplexer has a first input connected to an output of the first operational amplifier and a second input connected to an output of the second operational amplifier, the analog-to digital converter has an input connected to an output of the multiplexer and an output connected to the microprocessor, and the microprocessor controls the driver and the multiplexer.

64. The method of claim 61 further comprising performing the method during the ramp load.

65. The method of claim 61 further comprising performing the method during the ramp unload.

66. The method of claim 61 further comprising calculating a calibration constant and calculating the back EMF voltage using the calibration constant, wherein calculating the calibration constant includes:
measuring a reference voltage (Vref1) across the VCM while no current is applied to the VCM;
measuring a reference voltage (Vref2) across the sense resistor while no current is applied to the sense resistor;
measuring another voltage (Vvcm) across the VCM while a current is applied to the VCM;
measuring another voltage (Vrsense) across the sense resistor while a current is applied to the sense resistor; and
calculating the calibration constant (Kcal) according to the equation $$Kcal = \frac{Vvcm - Vref1}{Vrsense - Vref2}.$$

67. The method of claim 66 further comprising calculating the calibration constant only while the head is parked on the ramp during power-up of the disk drive.

68. The method of claim 61 further comprising calculating a control variable using the back EMF voltage and a target velocity voltage and adjusting the head velocity based on the control variable.

69. The method of claim 68 wherein calculating the control variable includes calculating a velocity error as a difference between the back EMF voltage and the target velocity voltage.

70. The method of claim 68 wherein calculating the control variable includes using a proportional-integral control technique that measures the VCM and sense resistor voltages during a current sampling period and uses a previous control variable from a previous sampling period.

* * * * *